April 27, 1926.                    E. PFLAUM                    1,582,144
ANIMAL SCRATCHING DEVICE
Filed Feb. 28, 1925
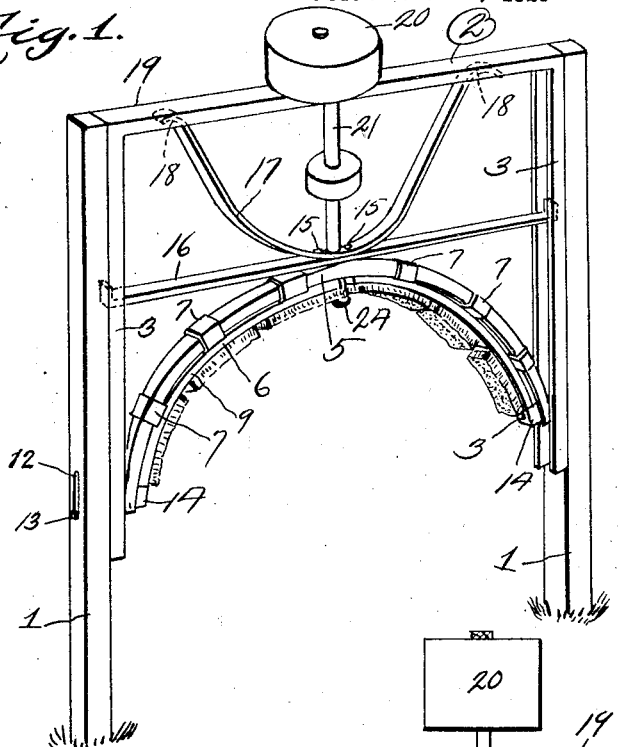
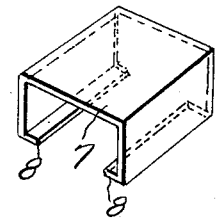
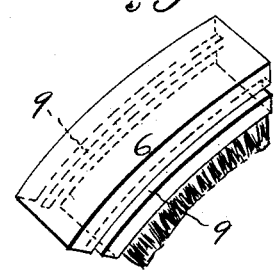
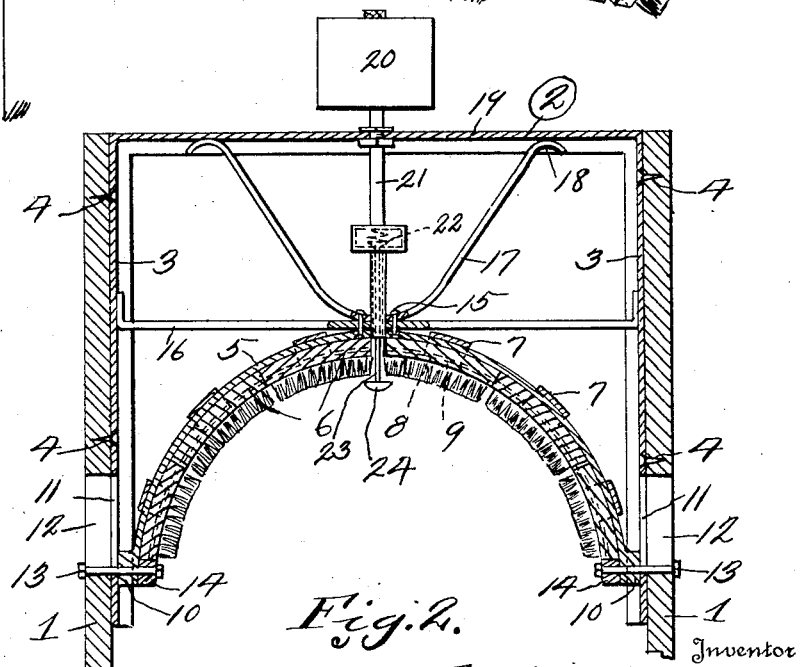
Inventor
Emil Pflaum
By Philip A. Ferrell
Attorney Patented Apr. 27, 1926.

1,582,144

UNITED STATES PATENT OFFICE.

EMIL PFLAUM, OF OMAHA, NEBRASKA.

ANIMAL-SCRATCHING DEVICE.

Application filed February 28, 1925. Serial No. 12,304.

*To all whom it may concern:*

Be it known that EMIL PFLAUM, a citizen of the United States, residing at Omaha, in the county of Douglas and State of Nebraska, has invented certain new and useful Improvements in Animal-Scratching Devices, of which the following is a specification, reference being had therein to the accompanying drawings.

The invention relates to back scratching devices for animals, and has for its object to provide a device of this character under which hogs and other animals may pass for scratching their backs, and to provide a device of this character which will accommodate itself to various heights of animals.

A further object is to provide a back scratching device for animals comprising spaced vertically disposed supports, to the inner sides of which are secured to the vertically disposed arms of a U-shaped frame formed from channel iron and in which arms are slidably mounted the ends of an arcuate brush carrying member, under which animals may pass. Also to provide a guide bar connected to the upper side of the brush carrying member and slidably mounted in the channel arms of the frame and a U-shaped spring connected to the bar and having its ends slidably mounted in the transverse portion of the channeled U-shaped member for normally exerting a downward pressure on the guide bar and the brush carrying member. The spring form means for allowing the device to accommodate itself to different heights of animals passing through the same.

A further object is to provide the ends of the brush carrying member with extensions slidably mounted in the channeled arms and through which extensions and vertically disposed slots in the arms and supports bolts extend for slidably connecting said ends of the brush holder to the support. Also to provide blocks in the ends of the channeled brush holder for preventing displacement of the brushes and through which blocks said bolts extend.

A further object is to provide U-shaped spring clamps adapted to arch the channeled brush holder and provided with flanges adapted to engage in grooves in the opposite sides of the brushes for holding said brushes within the brush holding member and allowing the same to be easily removed.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a perspective view of the animal scratching device.

Figure 2 is a vertical longitudinal sectional view through the device.

Figure 3 is a perspective view of one of the brush clamping spring members.

Figure 4 is a perspective view of one of the brushes.

Referring to the drawing, the numeral 1 designates spaced vertically disposed posts in parallel relation, and which posts are connected together by the inverted U-shaped frame 2, which is formed from channel iron and has its channeled arms 3 downwardly disposed and secured to the inner sides of the supports 2, preferably by screws 4. Disposed within the frame 2 between the arms 3 thereof is an inverted semicircular shaped channeled member 5, in which is disposed a plurality of brushes 6, and under which brushes an animal passes during a back scratching operation. By forming the brush carrying member 5 from channel iron, it is obvious the sides thereof will prevent lateral displacement of the brushes 6, however to prevent downward displacement of the brushes 6, U-shaped spring members 7 are provided, which members 7 arch the upper side of the brush carrying member 5 and are provided with inwardly extending flanges 8 which extend into grooves 9 in opposite sides of the brushes, therefore it will be seen that the brushes are positively held but in a manner for cleaning or replacement purposes.

The lower ends of the channeled brush carrying member 5 are provided with extensions 10 which are slidably mounted in the channeled arms 3 of the U-shaped frame 2, and extending through said extensions 10 and the registering vertically disposed slots 11 of the arms 3 and slots 12 of the posts 1 are bolts 13, which bolts are slidably mounted in said slots 11 and 12 and guide the brush carrying member during its upward and downward movement. The bolts 13 also extend through blocks 14 in the ends of the channeled brush carrying member, and which blocks prevent downward movement of the brushes. Connected by means of a rivet 15 to the upper side of the brush carrying member 5 is a horizontally disposed guide bar 16, the ends of which are slidably mounted in the arms 3 of the channeled frame, therefore it will be seen that when an animal applies pressure on the brushes to either side of the device, the brush holding member will be positively braced and held against side tilting which would bind the same. Also secured to the brush carrying member 5 is a U-shaped spring member 17, the arms of which extend upwardly and outwardly and terminate in curved portions 18 disposed in the horizontal portion 19 of the channeled frame 2, and which curved portions are guided in said channeled portion 19 of the frame during the upward and downward movement of the brush carrying frame as an animal passes under the same, therefore it will be seen that the device will accommodate itself to animals of various kinds and heights, and that the spring 17 will normally maintain the brush carrying frame in lowered position.

From the above it will be seen that an animal scratching device is provided which may be placed in a barn yard or hog pen, will accommodate itself to various kind and heights of animals, and one wherein pressure will be exerted on the scratching element as an animal passes thereunder. It will also be seen that the scratching or brushing elements may be easily and quickly removed and replaced for cleaning or replacement purposes.

Mounted on the transverse portion 19 of the U-shaped frame 2 is an oil tank 20, the discharge pipe 21 of which extends downwardly through the bar 19, the spring 17 and the guide bar 16, and is provided with a valve 22, which valve is carried by a vertically disposed valve rod 23, the lower end of which is provided with an enlargement 24 disposed beneath the brushes in a position whereby when an animal passes under the brushes the valve 22 will be unseated and oil will be discharged through the pipes 21 onto the back of the animal and onto the brushes, therefore it will be seen that an oiling device is provided in connection with the device.

The invention having been set forth what is claimed as new and useful is:—

1. An animal scratching device comprising spaced supports, an inverted U-shaped frame disposed between said supports and having its arms downwardly disposed, said frame being formed from channels, an inverted arched brush carrying member within said frame, the ends of said brush carrying member being slidably mounted in the arms of the U-shaped frame, a bar connected to the upper side of the brush carrying member and having its ends slidably mounted in the arms of the U-shaped frame and spring means interposed between said bar and the upper side of the U-shaped frame and forming means for normally forcing said brush carrying member downwardly.

2. An animal scratching device comprising spaced supports, an inverted U-shaped frame formed from channel iron and having its arms secured to the supports, an arched brush holder disposed within said frame, the ends of said brush holder being provided with members slidably mounted in the arms of the U-shaped frame, blocks disposed in the ends of the brush holder, bolts extending through said blocks, the ends of the brush holder and vertical slots of the frame arms and supports, a horizontally disposed bar carried by the upper side of the brush holder and having its ends slidably mounted in the arms of the U-shaped frame, a U-shaped spring connected to the bar substantially centrally thereof, said U-shaped spring having its arms extending upwardly and diverging, said spring arms terminating in sliding engagement within the horizontal portion of the inverted U-shaped frame.

3. The combination with a yieldably supported arcuate animal scratching device formed from channeled iron and guided in its upward and downward movement, of a plurality of brushes disposed in said device, U-shaped spring members arching the upper side of the device, inwardly extending flanges carried by said U-shaped spring members and disposed in channels in opposite sides of the brushes and removable blocks in the ends of the brush carrying member.

4. The combination with a yieldably supported arcuate scratching device vertically guidable in an inverted U-shaped frame, of a tank supported by said frame, a discharge pipe carried by said tank and extending through an aperture in the arcuate scratching device, a valve carried by said discharge pipe a valve stem extending through said discharge pipe and carried by said valve and an animal engaging member carried by the valve stem and disposed beneath the arcuate scratching device.

In testimony whereof I hereunto affix my signature.

EMIL PFLAUM.